(12) United States Patent
Nagar et al.

(10) Patent No.: US 11,748,917 B2
(45) Date of Patent: Sep. 5, 2023

(54) AUGMENTED REALITY-BASED ENVIRONMENTAL PARAMETER FILTERING

(71) Applicant: International Business Machines Corporation, Armonk, NY (US)

(72) Inventors: Raghuveer Prasad Nagar, Kota (IN); Sarbajit K. Rakshit, Kolkata (IN); Nimit S Chauhan, Bangalore (IN); Gaurav Kumar, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 17/206,323

(22) Filed: Mar. 19, 2021

(65) Prior Publication Data
US 2022/0301230 A1 Sep. 22, 2022

(51) Int. Cl.
*G06T 11/00* (2006.01)
*G06F 3/01* (2006.01)

(52) U.S. Cl.
CPC .............. *G06T 11/00* (2013.01); *G06F 3/011* (2013.01)

(58) Field of Classification Search
CPC .................................. G06T 11/00; G06F 3/011
See application file for complete search history.

(56) References Cited

U.S. PATENT DOCUMENTS

| | | | |
|---|---|---|---|
| 10,345,768 B2 | 7/2019 | Fullam et al. | |
| 10,445,934 B1* | 10/2019 | Worley, III | H04N 13/363 |
| 10,700,935 B1* | 6/2020 | Mousavi | G06N 20/00 |
| 10,976,999 B1* | 4/2021 | Browy | G06T 19/006 |
| 11,205,292 B1* | 12/2021 | Whitman | H04S 7/40 |
| 2013/0012763 A1 | 1/2013 | Waele | |
| 2014/0135997 A1* | 5/2014 | Bradley | G05D 23/1917 |
| | | | 700/278 |

(Continued)

FOREIGN PATENT DOCUMENTS

| | | |
|---|---|---|
| CN | 104191931 A | 12/2014 |
| CN | 204856090 U | 12/2015 |
| WO | 2005082134 A1 | 9/2005 |

OTHER PUBLICATIONS

Mishra, Ayaskanta, et al. ("Design and development of IoT-based latency-optimized augmented reality framework in home automation and telemetry for smart lifestyle." Journal of Reliable Intelligent Environments 6.3 (2020): 169-187.) (Year: 2020).*

(Continued)

*Primary Examiner* — Yu Chen
(74) *Attorney, Agent, or Firm* — Stosch Sabo (57) ABSTRACT

A method, system, and computer program product for augmented reality-based environmental parameter filtering are provided. The method determines an environmental parameter by a wearable augmented reality (AR) device. A visualization of the environmental parameter is generated on a display of the wearable AR device. The method generates a set of control options on the display of the wearable AR device. The set of control options are configured to modify the environmental parameter. A user interaction with the wearable AR device is detected. The user interaction selects a control option of the set of control options. The method interacts with an external device to modify the environmental parameter based on the selected control option.

20 Claims, 6 Drawing Sheets

(56) References Cited

U.S. PATENT DOCUMENTS

| | | | | |
|---|---|---|---|---|
| 2017/0006135 | A1* | 1/2017 | Siebel | G06Q 10/06 |
| 2017/0108838 | A1* | 4/2017 | Todeschini | G05B 15/02 |
| 2017/0269617 | A1* | 9/2017 | Daoud | G05B 15/02 |
| 2019/0368763 | A1* | 12/2019 | Noor | G06F 3/011 |
| 2019/0384865 | A1* | 12/2019 | Jaiswal | G06N 5/04 |
| 2019/0391544 | A1* | 12/2019 | Fullam | E06B 9/68 |
| 2020/0116373 | A1 | 4/2020 | Guan et al. | |
| 2021/0364281 | A1* | 11/2021 | Petill | G06T 19/006 |

OTHER PUBLICATIONS

Sun et al., "MagicHand: Interact with IoT Devices in Augmented Reality Environment", 2019 IEEE Conference on Virtual Reality and 3D User Interfaces, Published Date: Mar. 2019, 7 pages.

Mell et al., "The NIST Definition of Cloud Computing", Recommendations of the National Institute of Standards and Technology, Special Publication 800-145, Sep. 2011, 7 pages.

* cited by examiner

AUGMENTED REALITY-BASED ENVIRONMENTAL PARAMETER FILTERING

BACKGROUND

Augmented reality (AR) systems have increased in popularity as digital content is able to be visualized on head mounted or projected displays while providing limited interference to a user's physical surroundings.

SUMMARY

According to an embodiment described herein, a computer-implemented method for augmented reality-based environmental parameter filtering is provided. The method detects an environmental parameter by a wearable augmented reality (AR) device. A visualization of the environmental parameter is generated on a display of the wearable AR device. The method generates a set of control options on the display of the wearable AR device. The set of control options are configured to modify the environmental parameter. A user interaction with the wearable AR device is detected. The user interaction selects a control option of the set of control options. The method interacts with an external device to modify the environmental parameter based on the selected control option.

According to an embodiment described herein, a system for augmented reality-based environmental parameter filtering is provided. The system includes one or more processors and a computer-readable storage medium, coupled to the one or more processors, storing program instructions that, when executed by the one or more processors, cause the one or more processors to perform operations. The operations detect an environmental parameter by a wearable augmented reality (AR) device. A visualization of the environmental parameter is generated on a display of the wearable AR device. The operations generate a set of control options on the display of the wearable AR device. The set of control options are configured to modify the environmental parameter. A user interaction with the wearable AR device is detected. The user interaction selects a control option of the set of control options. The operations interact with an external device to modify the environmental parameter based on the selected control option.

According to an embodiment described herein, a computer program product for augmented reality-based environmental parameter filtering is provided. The computer program product includes a computer-readable storage medium having program instructions embodied therewith, the program instructions being executable by one or more processors to cause the one or more processors to detect an environmental parameter by a wearable augmented reality (AR) device. A visualization of the environmental parameter is generated on a display of the wearable AR device. The computer program product generates a set of control options on the display of the wearable AR device. The set of control options are configured to modify the environmental parameter. A user interaction with the wearable AR device is detected. The user interaction selects a control option of the set of control options. The computer program product interacts with an external device to modify the environmental parameter based on the selected control option.

DETAILED DESCRIPTION

The present disclosure relates generally to methods for augmented reality-based environmental parameter filtering. More particularly, but not exclusively, embodiments of the present disclosure relate to a computer-implemented method for filtering environmental parameters based on manipulation of physical devices through augmented-reality interfaces. The present disclosure relates further to a related system for augmented reality-based environmental parameter filtering, and a computer program product for operating such a system.

AR systems enable visualization of digital content. The digital content may be superimposed over a physical surrounding of a user when projected onto or otherwise presented on a display of an AR device. Regardless of the device used, environmental parameters may disturb, distract, or otherwise interrupt a user experience. For example, sounds, smells, wind flows, humidity, temperature, and light may frustrate a user's experience in interacting with an AR or other computing device. Further, it would be beneficial to enable users to filter or mitigate one or more environmental parameter based on a user's activity, location, and state or value of the parameter. For example, filtering out a noise may increase usability or enjoyability of a user experience with a computing device.

Embodiments of the present disclosure enable an artificial intelligence (AI), AR, and Internet of Things (IoT) system and method capable of controlling or modifying environmental parameters using an AR device. Some embodiments of the present disclosure provide an AR system to filter environmental parameters such as sound, smell, temperature, and light. The AR systems may cooperate with IoT devices configured to physically manipulate environmental factors surrounding a user of the AR system. The IoT devices of the present disclosure may enable user automation steps and physical devices within a building or surroundings of the user of an AR system.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
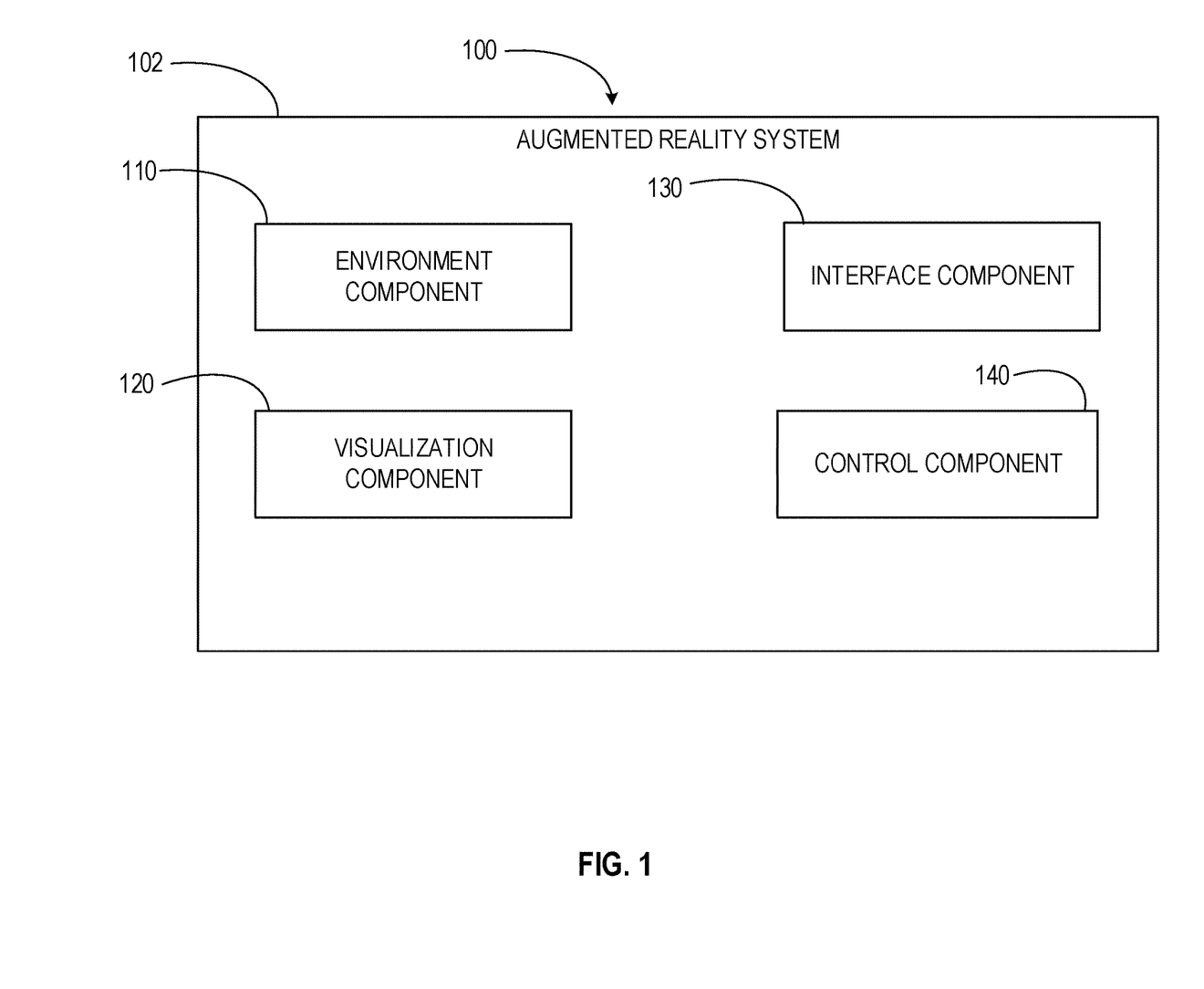
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an augmented reality system 102. The augmented reality system 102 may comprise an environment component 110, a visualization component 120, an interface component 130, and a control component 140. The environment component 110 detects environmental parameters. The visualization component 120 generates visualizations of detected environmental parameters. The interface component 130 generates interfaces within a display device of a wearable AR device and identifies user interactions with the generated interfaces. The control component 140 controls external devices to modify environmental parameters based on selections received from the interface component 130. Although described with distinct components, it should be understood that, in at least some embodiments, components may be combined or divided, and/or additional components may be added without departing from the scope of the present disclosure.

Figure 2:
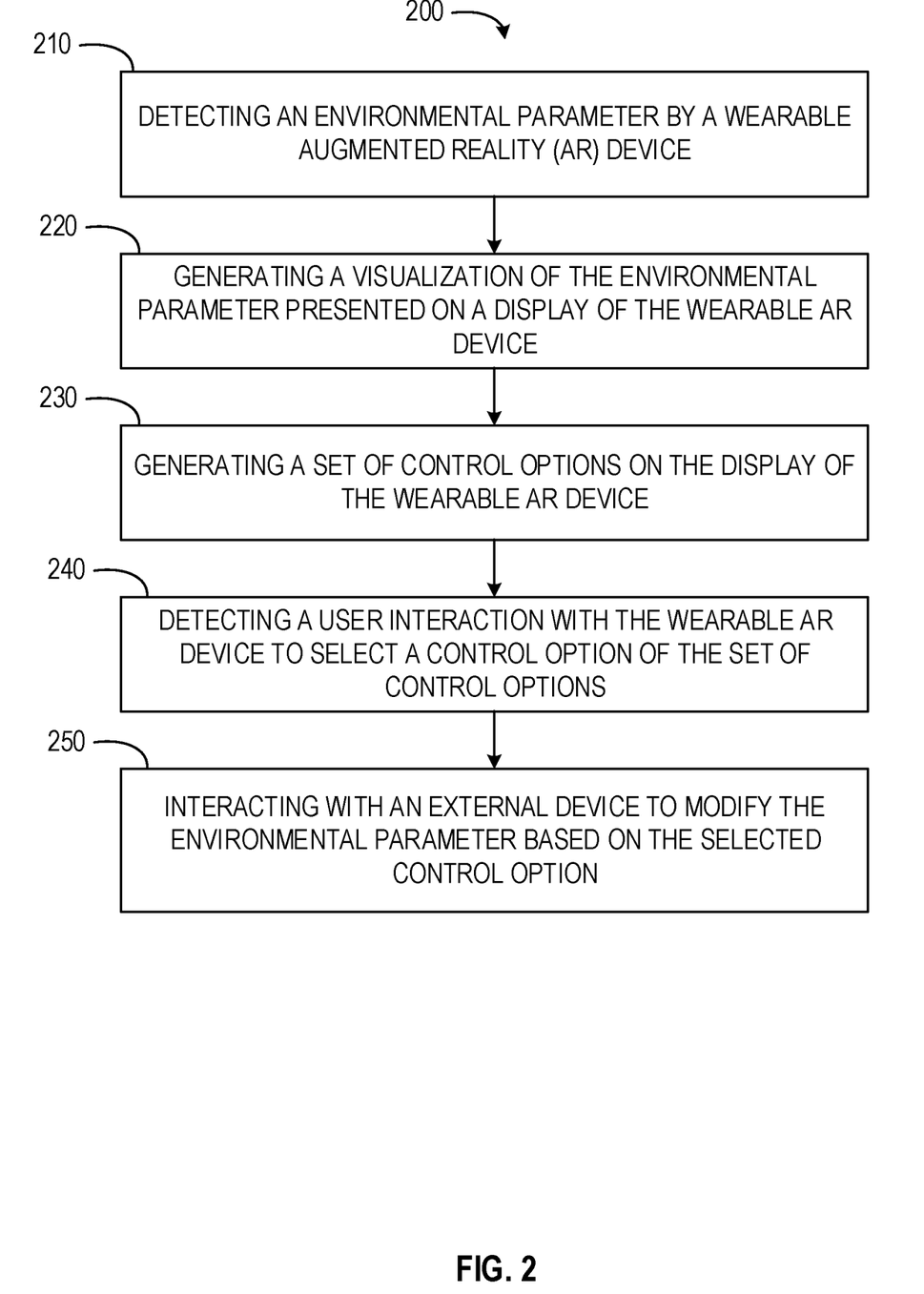
FIG. 2 depicts a flow diagram of a computer-implemented method for augmented reality-based environmental parameter filtering, according to at least one embodiment.

Referring now to FIG. 2, a flow diagram of a computer-implemented method 200 is shown. The computer-implemented method 200 is a method for augmented reality-based environmental parameter filtering. In some embodiments, the computer-implemented method 200 may be performed by one or more components of the computing environment 100, as described in more detail below.

At operation 210, the environment component 110 detects or determines an environmental parameter by an augmented reality (AR) device. In some embodiments, the AR device is a wearable augmented reality device. In some instances, the environmental parameter is a plurality of environmental parameters. The AR device may be a head mounted AR device, such as augmented reality glasses or an augmented reality headset. In some embodiments, the environment component 110 detects the environmental parameter by detecting a user context. The user context may be detected by one or more sensors communicatively coupled to the wearable AR device. In some instances, the one or more sensors detecting a user context may be a user-facing image capture device, a microphone, a keyboard, a gesture capture device, or any other suitable sensor. The environment component 110 may then determine the environmental parameter based on the user context. For example, the wearable AR device may detect a light source coming from a window by detecting and analyzing an expression or utterance of a user of the wearable AR device and a movement associated with the expression or utterance in the direction of the open window. By way of another example, the wearable AR device may detect a loud sound coming from the window based on one or more microphones connected to or communicatively coupled to the wearable AR device.

In some embodiments, the environment component 110 detects the environmental parameter by detecting an environmental input at one or more environmental sensor. The environmental sensor may be communicatively coupled to the wearable AR device. In some embodiments, the one or more environmental sensor is an Internet of Things (IoT) sensor. The IoT sensor may be positioned within or outside a building or structure. In some instances, the IoT sensor may be an olfactory sensor, a microphone, an image capture device, or any other suitable sensor capable of or configured to sense elements, aspects, events, or other environmental parameters. The IoT sensor may be connected to an intelligent home system or home automation system. The intelligent home or home automation system may include the IoT sensor(s), IoT control devices configured to modify aspects of the home (e.g., open windows, control an air conditioner, dispense air freshener, etc.).

In some embodiments, the environment component 110 detects a stimulus for changing environmental parameters based on real-time gesture analysis, machine learning, real-time internet searching, combinations thereof, or any other suitable manner using sensors of the wearable AR device and the IoT sensors. The real-time gesture analysis may use sensors observing the user, such as cameras observing a user looking toward a sound or light source. The real-time gesture analysis may also correlate information from the gesture sensors with other sensors, such as microphones. The environment component 110 may use supervised or unsupervised machine learning techniques to generate personalized sensor models for an individual user of a wearable AR device. In some instances, unsupervised machine learning may use K-means clustering for environmental parameter detection and R-CNN for interaction or activity detection. For example, when a light source has a value higher than a specified value and the user took an action, a personalized sensor model for the individual may determine a similar future environmental parameter may trigger a user response and generate a set of possible options in conjunction with other components of the augmented reality system 102. In some instances, the environmental component 110 may use real-time internet searching to determine safe levels of environmental parameters, identify new types of environmental parameters, identify corrective actions to take based on a type of environmental parameter, combinations thereof, or any other supporting action to aid in the personalized sensor model identifying a suitable action to be performed.

At operation 220, the visualization component 120 generates a visualization of the environmental parameter. The visualization may be presented on a display of the wearable AR device. In some embodiments, the environmental parameter is detected with a visualization. In such instances, the visualization component 120 generates the visualization of the environmental parameter as including the direction of the environmental parameter. In such instances, the visualization may be divided into a set of visualizations. In the example of the sound or light source emanating from the open window, the visualization component 120 may receive and generate a first visualization indicating an approximate location of the source of the environmental parameter (e.g., a circle or highlighting of the open window). The visualization component 120 may then generate a second visualization depicting a direction of the environmental parameter emanating at the window and moving to or toward the user of the wearable AR device.

At operation 230, the interface component 130 generates a set of control options on the display of the wearable AR device. In some embodiments, the set of control options is configured to modify the environmental parameter. The set of control options may be configured to eliminate the environmental parameter or modify the environmental parameter. For example, a portion of the set of control options may be associated with an IoT device to modify the environmental parameter in a binary manner (e.g., open or close a window) to enable or eliminate the environmental parameter. In some embodiments, a portion of control options are configured to modify the environmental parameter to a varying degree according to a user interaction. For example, the portion of control options may modify a window position to partially open or close the window based on the user interaction to partially modify the environmental parameter. In such instances, each control option may have a recommended value and a set of permissible values. The recommended value may be a preset value, and the set of permissible values may include a range of values selectable by the user.

Where the environmental parameter has a direction, the set of control options includes a direction change option for the environmental parameter. The direction change option may perform one or more operations to cause a direction change of the environmental parameter. For example, the direction change option may cause actuation of a device to close a first window proximate to the sound or light source location, and open a second window at a different location to cause the environmental parameter to emanate from the second window at a location distinct from the first window.

The set of control options may include a set of user interface elements. The set of user interface elements may be icons or representations of actions. The actions may be selected from a set of actions capable of eliminating or impacting the environmental parameter. In some embodiments, the actions may include actuation of mechanical devices (e.g., windows or scent devices), heating devices, air conditioning devices, electrical devices (e.g., fans or lights), combinations thereof, or any other suitable devices capable of modifying the environmental parameter.

In some embodiments, each control option is associated with a control gesture. The control gestures may be predefined within a user interface. In some instances, the control gestures are dynamically learned based on user actions. For example, a user pointing an index finger at a window and moving it from top to bottom may be a control gesture to close the window. In some embodiments, the set of control gestures may be preset by the user. The user may be provided with a set of actions capable of being performed by the augmented reality system 102 based on external devices coupled thereto. The user may then enter a personal control gesture for one or more of the set of actions.

In some embodiments, the interface component 130 generates the set of control options by accessing a user profile. The user profile may associate one or more user parameters with a set of environmental parameters. User parameters may include actions, gestures, searches, spoken words, or other reactions to historical environmental parameters. The interface component 130 may then determine a plurality of control options within the user profile associated with the environmental parameter detected by the wearable AR device. The interface component 130 may then select two or more control options of the plurality of control options for inclusion in the set of control options.

In the example of the light source coming from the window, the interface component 130 may cooperate with the visualization component 120 to determine control options appropriate to addressing the light source based on historical environmental parameters, historical IoT device actions, and user interface actions performed by the user of the wearable AR device. The interface component 130 may then generate icons for the set of control options and cause presentation of the set of control options for alleviating the light source. In the example of the sound coming from the window, the interface component 130 and the visualization component 120 may perform similar actions and present a different set of control options to the user.

Where multiple environmental parameters are present, the interface component 130 may present sets of control options for each environmental parameter separately. In such instances, the multiple environmental parameters may be controlled individually and sequentially. In some embodiments, the interface component 130 presents a set of interfaces for the user. The set of interfaces may include a control interface and a parameter interface. The parameter interface may initially be presented to the user to provide a visualization for each environmental parameter of the plurality of environmental parameters or multiple environmental parameters. The user may select an icon for a specified environmental parameter within the parameter interface. The interface component 130 may then present a selected control interface for the selected or specified environmental parameter. The selected control interface may include a set of control options associated with the selected environmental parameter.

At operation 240, the interface component 130 detects a user interaction with the wearable AR device. The user interaction may select a control option of the set of control options. In some embodiments, the user interaction selects the control option using a gesture captured by a sensor or image capture device of the wearable AR device. For example, the user interaction may be detected as a finger gesture by an image capture device or motion detection sensor. The finger or hand gesture may also be detected by a remote sensing device communicatively coupled to the wearable AR device. The remote sensing device may be a sensor attached to a device capable of communicating sensor information detected at the remote sensor to the wearable AR device. For example, the remote sensing may be a smart watch, a remote controller, an infrared camera, an accelerometer, a gyroscope, a smartphone, combinations thereof, or any other suitable remote sensing device. The remote sensing device may detect the finger or hand gesture representing the user interaction and transmit an indication of the gesture to the wearable AR device.

At operation 250, the control component 140 interacts with an external device to modify the environmental parameter. The interaction may be based on the selected control option. The external device may be a device external to the wearable AR device. For example, the external device may be a servo, a motor, a valve, or any other physical device capable of affecting the environmental parameter or affecting an object capable of affecting the environmental parameter. In some embodiments, the control component 140 operates the external device in a binary manner. For example, the control component 140 may operate an IoT device connected to a window in order to open or close the window to eliminate a light source or sound. In some instances, the control component 140 operates the external device to a degree indicated by the selected control option. For example, the control component 140 may operate the IoT device to partially open or close the window to reduce a sound or breeze coming through the window.

Figure 3:
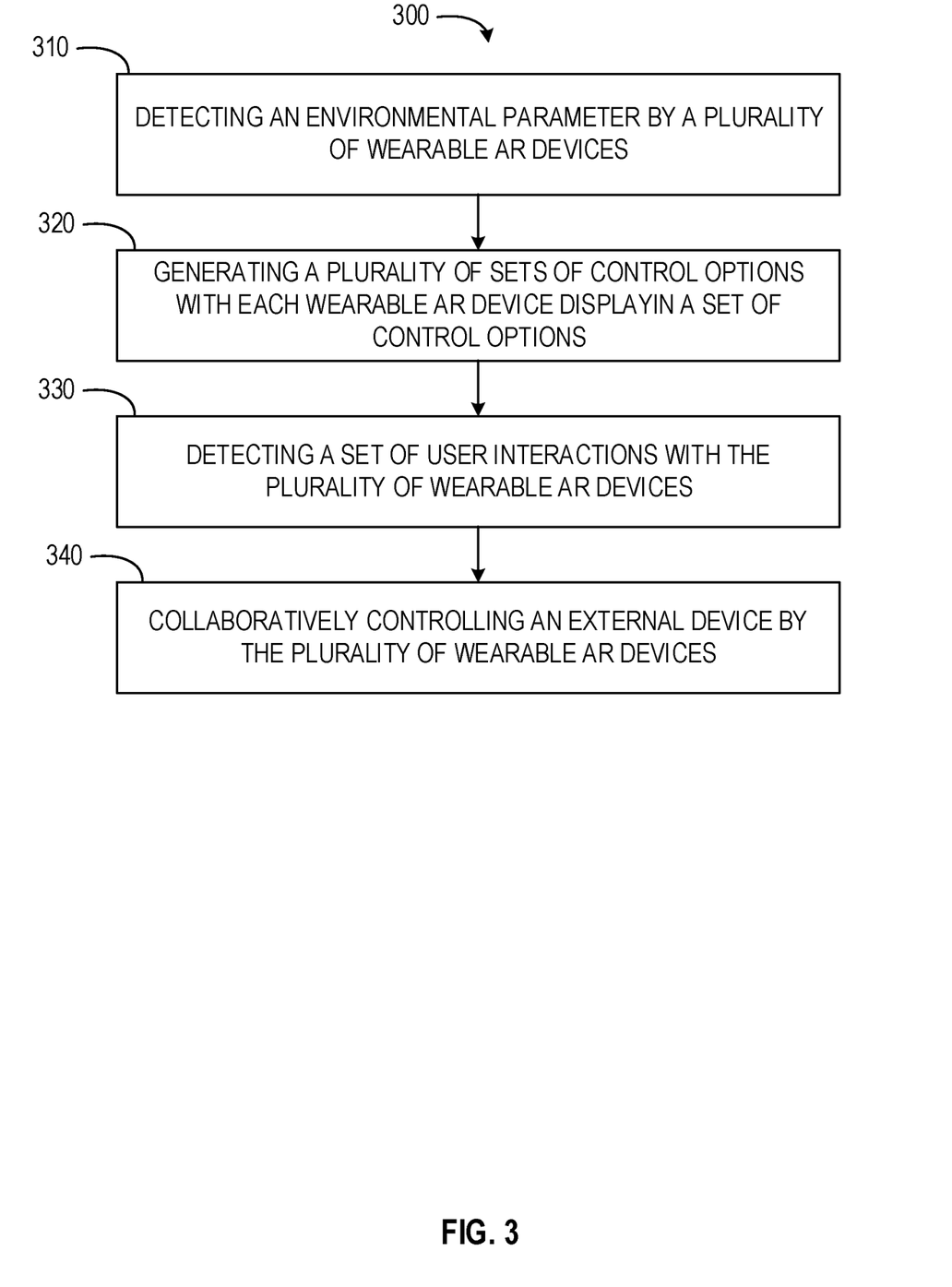
FIG. 3 depicts a flow diagram of a computer-implemented method for augmented reality-based environmental parameter filtering, according to at least one embodiment.

FIG. 3 shows a flow diagram of an embodiment of a computer-implemented method 300 for augmented reality-based environmental parameter filtering. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the environment component 110 detects an environmental parameter by a plurality of wearable AR devices. The environment component 110 may detect the environmental parameter based on actions, interactions, or responses of a plurality of users operating the plurality of wearable AR devices. The environment component 110 may also detect the environmental parameter based on IoT sensors or other sensors communicatively coupled to at least one of the plurality of wearable AR devices. In some embodiments, the environment component 110 detects the environmental parameter in a manner similar to or the same as described above with respect to operation 210.

In operation 320, the interface component 130 of each wearable AR device of the plurality of wearable (AR) devices generates a set of control options. In such instances, a plurality of sets of control options are generated. Each wearable AR device displays a set of control options of the plurality of sets of control options. In some embodiments, each interface component 130 generates a set of control options in a manner similar to or the same as described above with respect to operation 230.

In some instances, the visualization component 120 of each wearable AR device generates and depicts a visualization of the environmental parameter within an associated wearable AR device. Each visualization component 120 may generate and display a distinct visualization of the environmental parameter, such that the environmental parameter is visualized based on one or more of a position of the environmental parameter, a position of the wearable AR device, and a direction of the environmental parameter relative to the position of the environmental parameter and a position of a wearable AR device. The visualization component 120 of each wearable AR device may generate and depict the visualization of the environmental parameter for a respective wearable AR device in a manner similar to or the same as described above with respect to operation 220.

In some embodiments, the interface component 130 of each wearable AR device generates a distinct set of control operations based on the visualization of the environmental parameter generated for and displayed on the respective wearable AR device. For example, a first wearable AR device may generate control options for the environmental parameter detected and visualized to a right hand side of the first wearable AR device while a second wearable AR device may generate control options for the environmental parameter detected and visualized to the left hand side. In such instances, the relative position of the first wearable AR device and the second wearable AR device to the environmental parameter causes a distinction between the visualization, display, and control options for the first wearable AR device and the second wearable AR device.

In operation 330, the interface component 130 detects a set of user interactions with the plurality of wearable AR devices. In such instances, each user interaction is detected by an interface component 130 of the wearable AR device of a separate user. Each user interaction may select a control option of the set of control options. Each user interaction may be detected within a specified time period, or within a specified time limit relative to detection of a user interaction of another wearable AR device of the plurality of wearable AR devices. For example, the interface component 130 of a first wearable AR device may detect a first user interaction at a first time and the interface component 130 of a second wearable AR device may detect a second user interaction at a second time. The first interaction and the second interaction may be detected at a same time. The first interaction and the second interaction may be detected at different times within a specified time limit. Where the second interaction is detected at a second time, outside of the specified time limit, the second interaction may be ignored. The interface component 130 of each wearable AR device may detect the set of user interactions in a manner similar to or the same as described above with respect to operation 240.

In operation 340, the control component 140 collaboratively controls the external device by the plurality of wearable AR devices. In some embodiments, the control component 140 controls the external device based on the set of user interactions. The control component 140 may average the selected control options of the plurality of wearable AR devices to determine which control option is selected to control the external device. In some instances, a control option receiving a largest number of selections from the wearable AR devices is selected for controlling the external device. In some embodiments, the control component 140 of each wearable AR device may cooperate to control the external device in a manner similar to or the same as described above with respect to operation 250.

The interface component 130 of each wearable AR device may generate a display reflecting collaborative control of the external device. Each interface component 130 of the plurality of wearable AR devices generate a control interface element. The control interface element may indicate an action taken to control the external device. In some instances, the control interface element indicates which control operation was selected from the set of control options. The control interface element may include a visualization of how other participants control, provide control input, or collaboratively control the environmental parameter.

Figure 4:
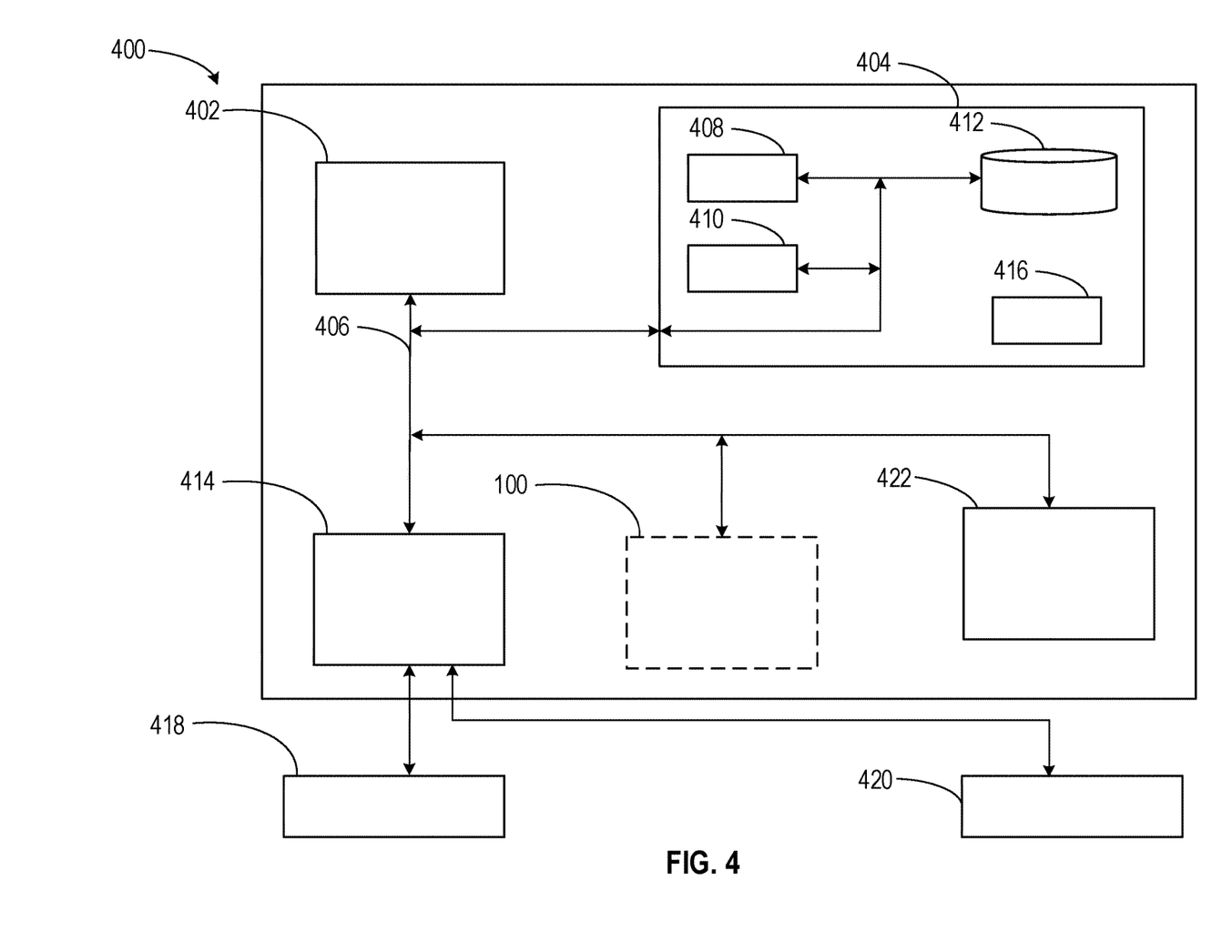
FIG. 4 depicts a block diagram of a computing system for augmented reality-based environmental parameter filtering, according to at least one embodiment.

Embodiments of the present disclosure may be implemented together with virtually any type of computer, regardless of the platform, suitable for storing and/or executing program code. FIG. 4 shows, as an example, a computing system 400 (e.g., cloud computing system) suitable for executing program code related to the methods disclosed herein and for augmented reality-based environmental parameter filtering.

The computing system 400 is only one example of a suitable computer system and is not intended to suggest any limitation as to the scope of use or functionality of embodiments of the present disclosure described herein, regardless of whether the computer system 400 is capable of being implemented and/or performing any of the functionality set forth hereinabove. In the computer system 400, there are components that are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the environment component 110, the visualization component 120, the interface component 130, and the control component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
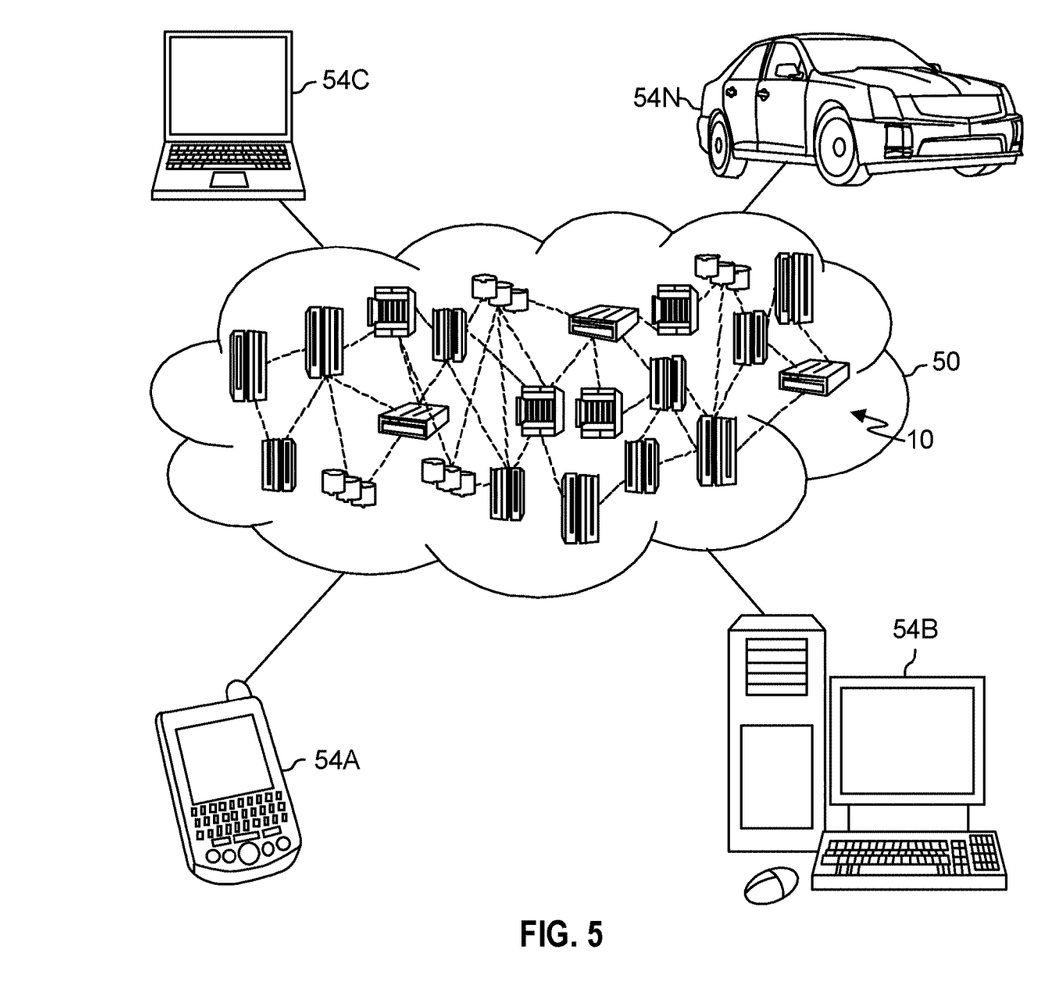
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
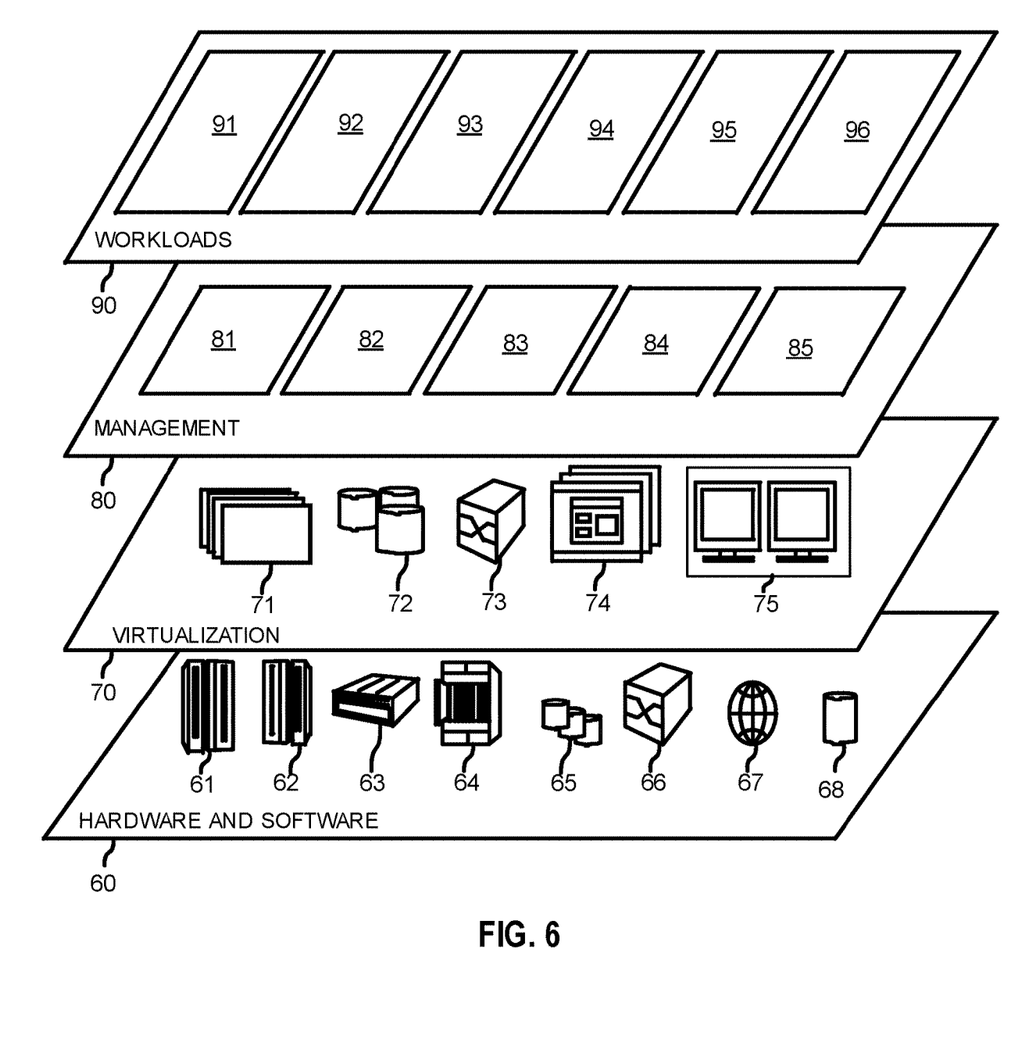
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmented reality environment filter processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining multiple environmental parameters by at least one of a plurality of wearable augmented reality (AR) devices, wherein the multiple environmental parameters comprise a sound profile, a temperature profile, a light profile, and a smell profile;
   generating a visualization of the multiple environmental parameters on a display of each of the plurality of wearable AR devices, wherein the visualization includes a source of the multiple environmental parameters and a direction of the multiple environmental parameters;
   generating a set of control options on the display of each of the plurality of wearable AR devices, the set of control options configured to modify a connected Internet of Things (IOT) device capable of altering the multiple environmental parameters;
   detecting a set of user interactions with the plurality of wearable AR devices, the set of user interactions each comprising a gesture representing a selected control option of the set of control options; and
   based on the set of user interactions, collaboratively altering a state of the connected IoT device to modify the multiple environmental parameters.

2. The method of claim 1, wherein determining the multiple environmental parameters further comprises:
   detecting a user context by one or more sensors communicatively coupled to the at least one of the plurality of wearable AR devices; and
   determining the multiple environmental parameters based on the user context.

3. The method of claim 1, wherein determining the multiple environmental parameters further comprises:
   detecting an environmental input at one or more environmental sensors communicatively coupled to the at least one of the plurality of wearable AR devices.

4. The method of claim 3, wherein the one or more environmental sensors is an Internet of Things (IOT) sensor located within a building and configured to communicate with the at least one of the plurality of wearable AR devices.

5. The method of claim 1, wherein generating the set of control options further comprises:
   accessing a user profile associating one or more user parameters with a set of environmental parameters;
   determining a plurality of control options within the user profile associated with the multiple environmental parameters detected by the at least one of the plurality of wearable AR devices; and
   selecting two or more control options of the plurality of control options for inclusion in the set of control options.

6. The method of claim 1, wherein the set of control options includes a direction change option for the multiple environmental parameters.

7. The method of claim 1, wherein the connected IoT device is a window, and wherein the state of the connected IoT devices relates to a position of the window.

8. The method of claim 1, wherein the set of control options comprises a recommended value and a set of permissible values.

9. A system, comprising:
   one or more processors; and
   a computer-readable storage medium, coupled to the one or more processors, storing program instructions that, when executed by the one or more processors, cause the one or more processors to perform operations comprising:
   determining multiple environmental parameters by at least one of a plurality of wearable augmented reality (AR) devices, wherein the multiple environmental parameters comprise a sound profile, a temperature profile, a light profile, and a smell profile;
   generating a visualization of the multiple environmental parameters on a display of each of the plurality of wearable AR devices, wherein the visualization includes a source of the multiple environmental parameters and a direction of the multiple environmental parameters;
   generating a set of control options on the display of each of the plurality of wearable AR devices, the set of control options configured to modify a connected Internet of Things (IOT) device capable of altering the multiple environmental parameters;
   detecting a set of user interactions with the plurality of wearable AR devices, the set of user interactions each comprising a gesture representing a selected control option of the set of control options; and
   based on the set of user interactions, collaboratively altering a state of the connected IoT device to modify the multiple environmental parameters.

10. The system of claim 9, wherein determining the multiple environmental parameters further comprises:

detecting a user context by one or more sensors communicatively coupled to the at least one of the plurality of wearable AR devices; and determining the multiple environmental parameters based on the user context.

11. The system of claim 9, wherein determining the multiple environmental parameters further comprises:

detecting an environmental input at one or more environmental sensors communicatively coupled to the at least one of the plurality of wearable AR devices.

12. The system of claim 11, the one or more environmental sensors is an Internet of Things (IOT) sensor located within a building and configured to communicate with the at least one of the plurality of wearable AR devices.

13. The system of claim 9, wherein generating the set of control options further comprises:

accessing a user profile associating one or more user parameters with a set of environmental parameters;

determining a plurality of control options within the user profile associated with the multiple environmental parameters detected by the at least one of the plurality of wearable AR devices; and selecting two or more control options of the plurality of control options for inclusion in the set of control options.

14. The system of claim 9, wherein the set of control options includes a direction change option for the multiple environmental parameters.

15. The system of claim 9, wherein the set of control options comprises a recommended value and a set of permissible values.

16. A computer program product comprising a computer readable storage medium having program instructions embodied therewith, the program instructions being executable by one or more processors to cause the one or more processors to perform operations comprising:

determining multiple environmental parameters by at least one of a plurality of wearable augmented reality (AR) devices, wherein the multiple environmental parameters comprise a sound profile, a temperature profile, a light profile, and a smell profile;

generating a visualization of the multiple environmental parameters on a display of each of the plurality of wearable AR devices, wherein the visualization includes a source of the multiple environmental parameters and a direction of the multiple environmental parameters;

generating a set of control options on the display of each of the plurality of wearable AR devices, the set of control options configured to modify a connected Internet of Things (IOT) device capable of altering the multiple environmental parameters;

detecting a set of user interactions with the plurality of wearable AR devices, the set of user interactions each comprising a gesture representing a selected control option of the set of control options; and based on the set of user interactions, collaboratively altering a state of the connected IoT device to modify the multiple environmental parameters.

17. The computer program product of claim 16, wherein determining the multiple environmental parameters further comprises:

detecting a user context by one or more sensors communicatively coupled to the at least one of the plurality of wearable AR devices; and determining the multiple environmental parameters based on the user context.

18. The computer program product of claim 16, wherein determining the multiple environmental parameters further comprises:

detecting an environmental input at one or more environmental sensors communicatively coupled to the at least one of the plurality of wearable AR devices, the one or more environmental sensors being an Internet of Things (IOT) sensor within a building and configured to communicate with the at least one of the plurality of wearable AR devices.

19. The computer program product of claim 16, wherein generating the set of control options further comprises:

accessing a user profile associating one or more user parameters with a set of environmental parameters;

determining a plurality of control options within the user profile associated with the multiple environmental parameters detected by the at least one of the plurality of wearable AR devices; and selecting two or more control options of the plurality of control options for inclusion in the set of control options.

20. The computer program product of claim 16, wherein the set of control options comprises a recommended value and a set of permissible values.

* * * * *